Sept. 19, 1933.  F. S. HEBDEN  1,927,263
WEIGHING MECHANISM
Filed March 23, 1931  6 Sheets-Sheet 3
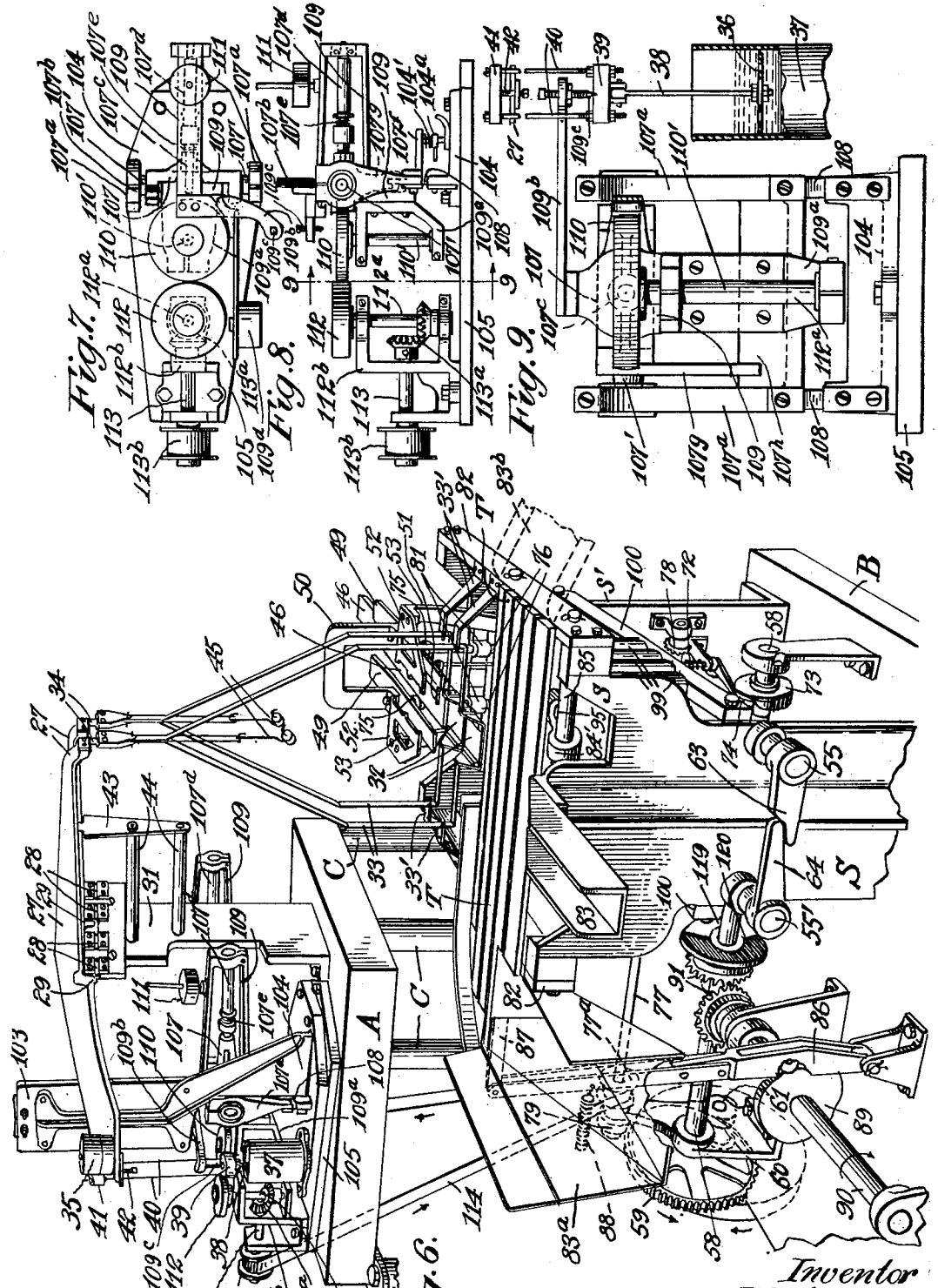

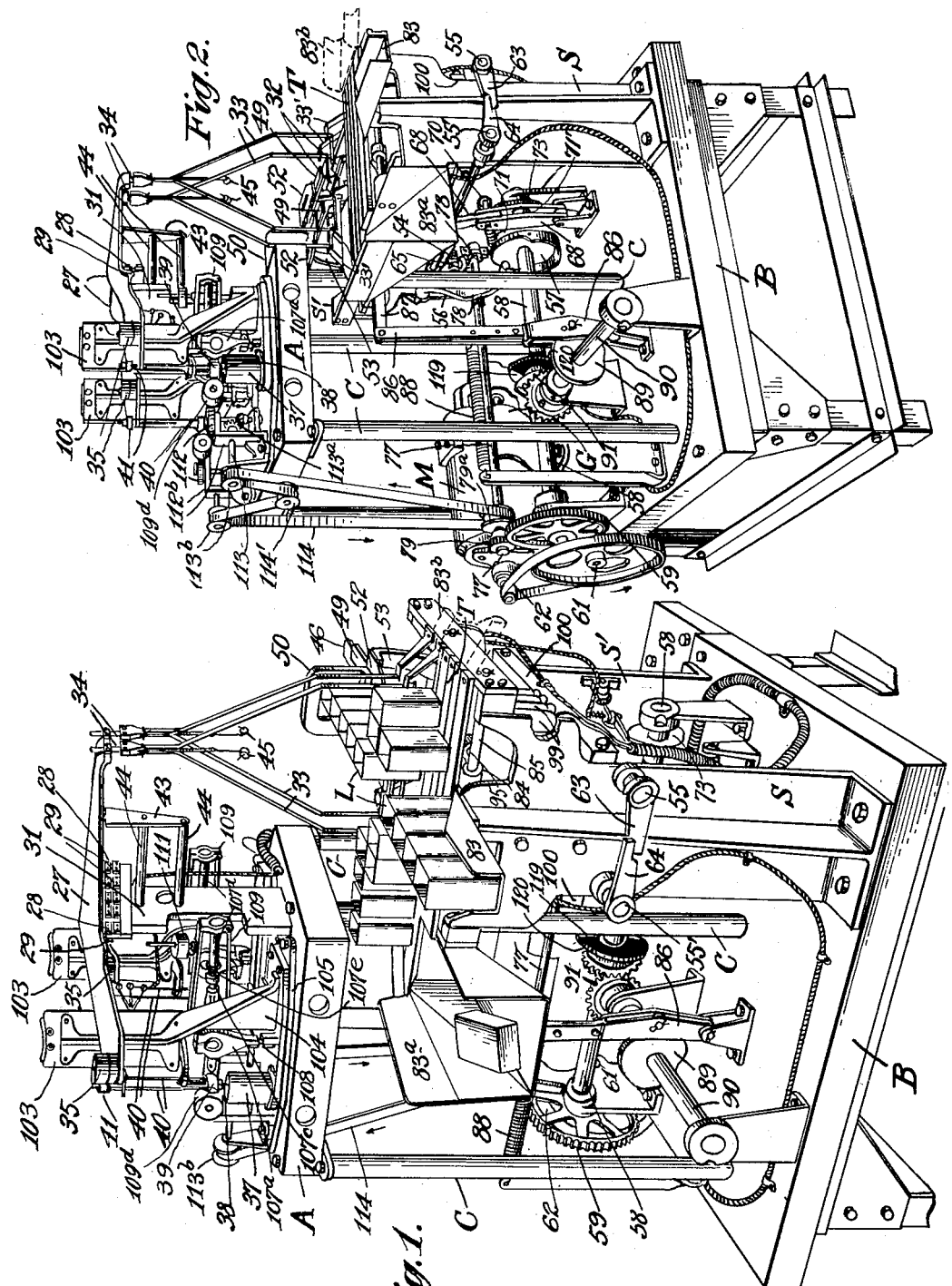

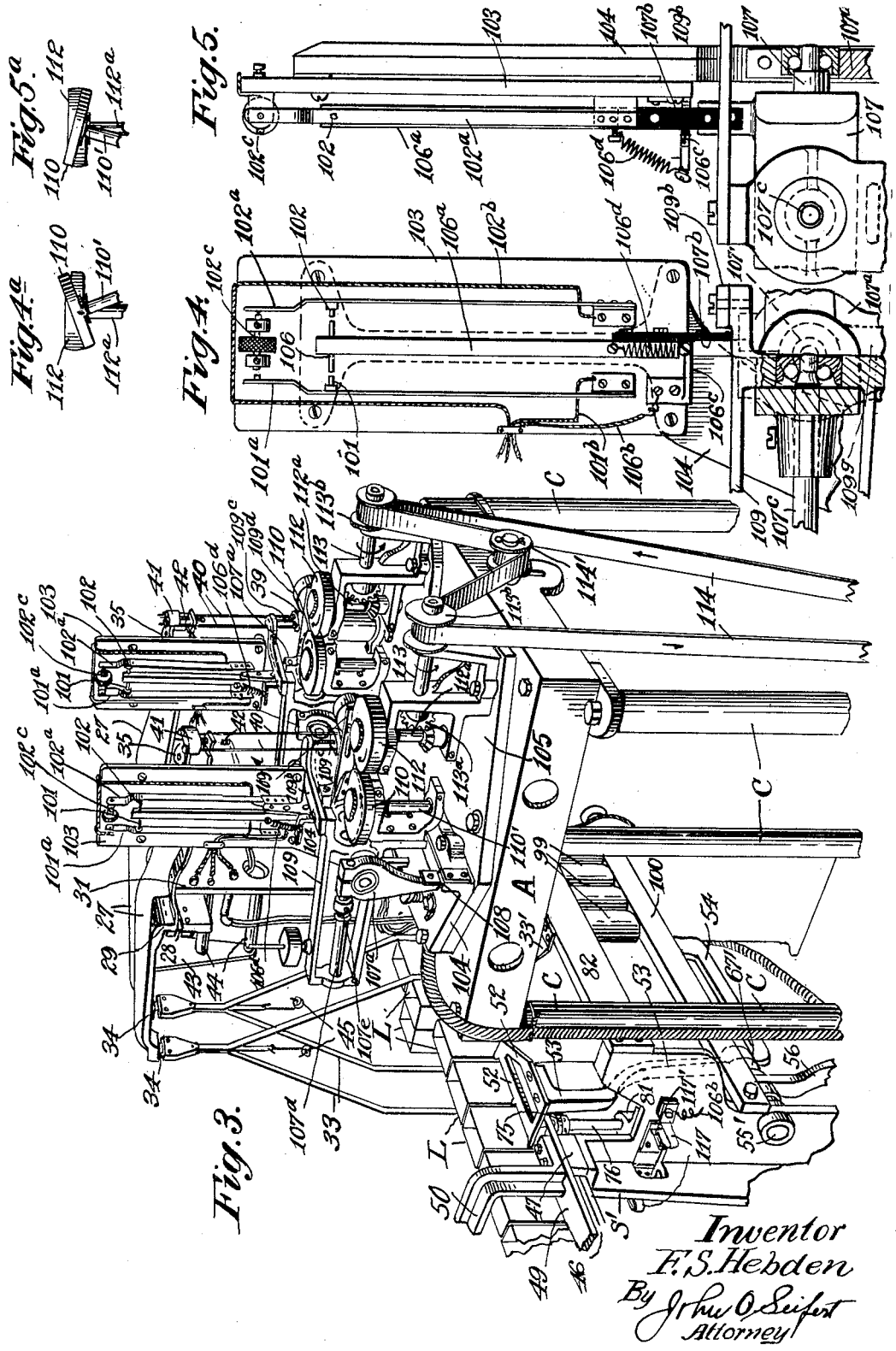

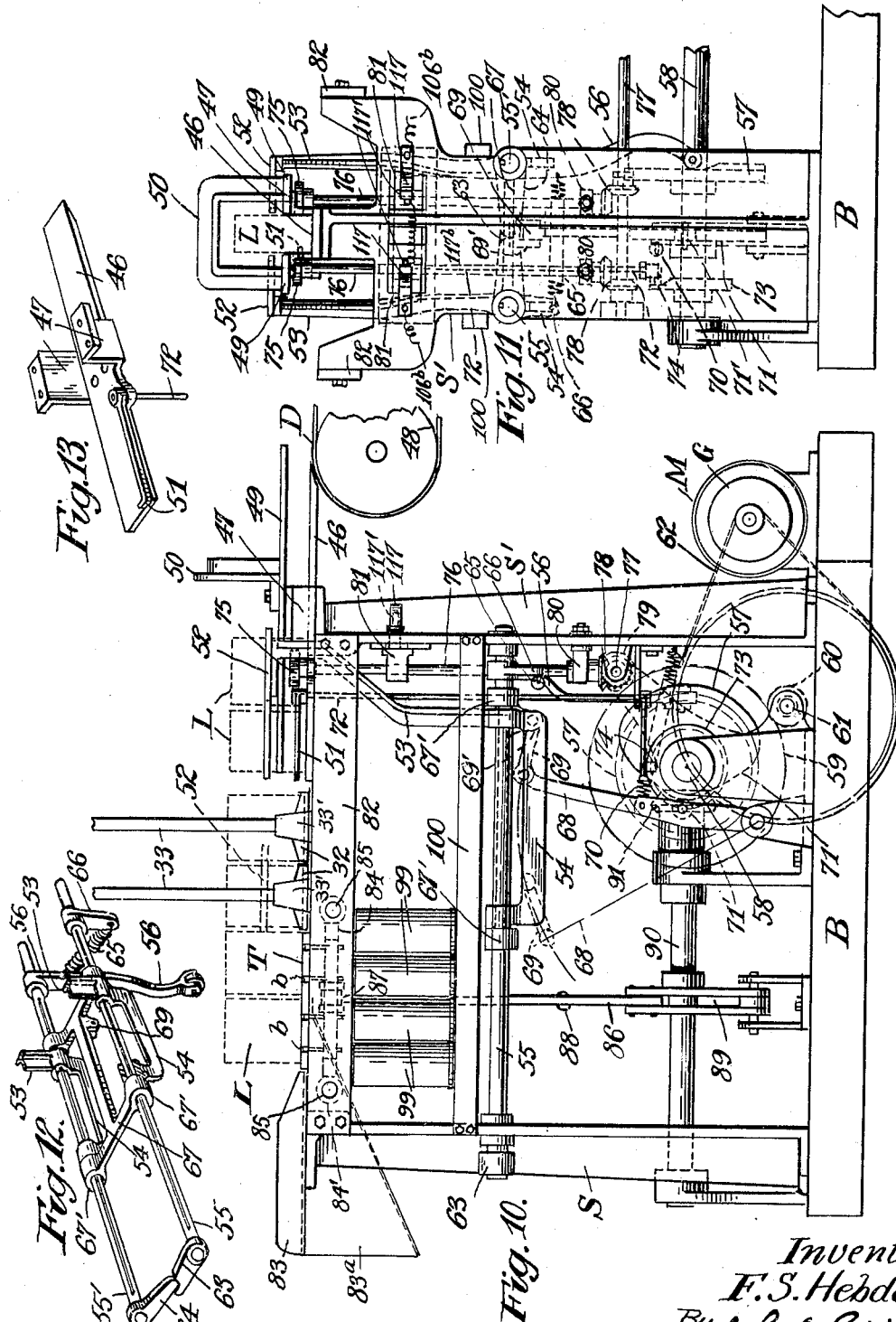

Sept. 19, 1933.                F. S. HEBDEN                    1,927,263
                           WEIGHING MECHANISM
                    Filed March 23, 1931        6 Sheets-Sheet 5
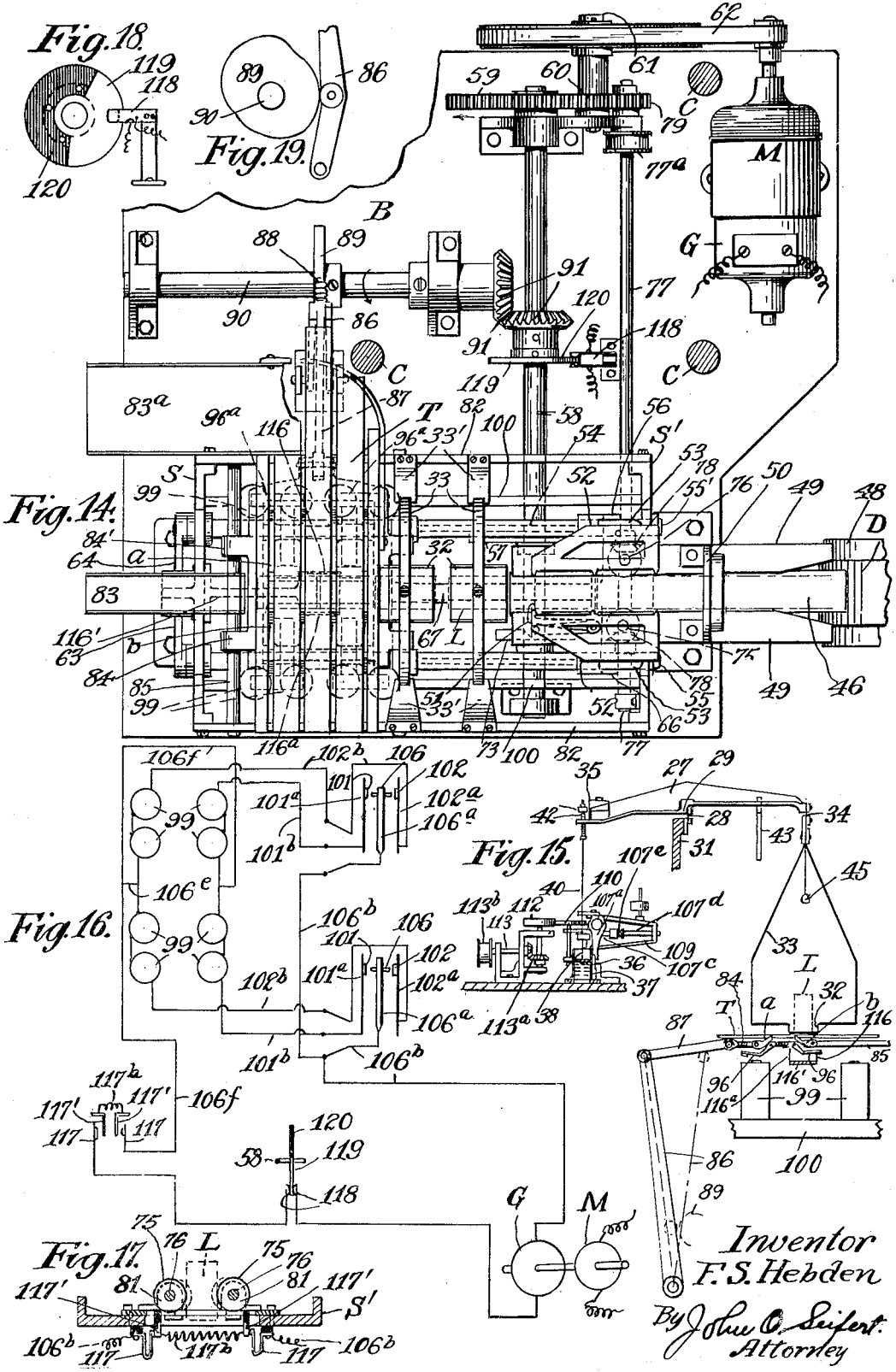
Inventor
F. S. Hebden
By John O. Seifert
Attorney Sept. 19, 1933.  F. S. HEBDEN  1,927,263
WEIGHING MECHANISM
Filed March 23, 1931   6 Sheets-Sheet 6
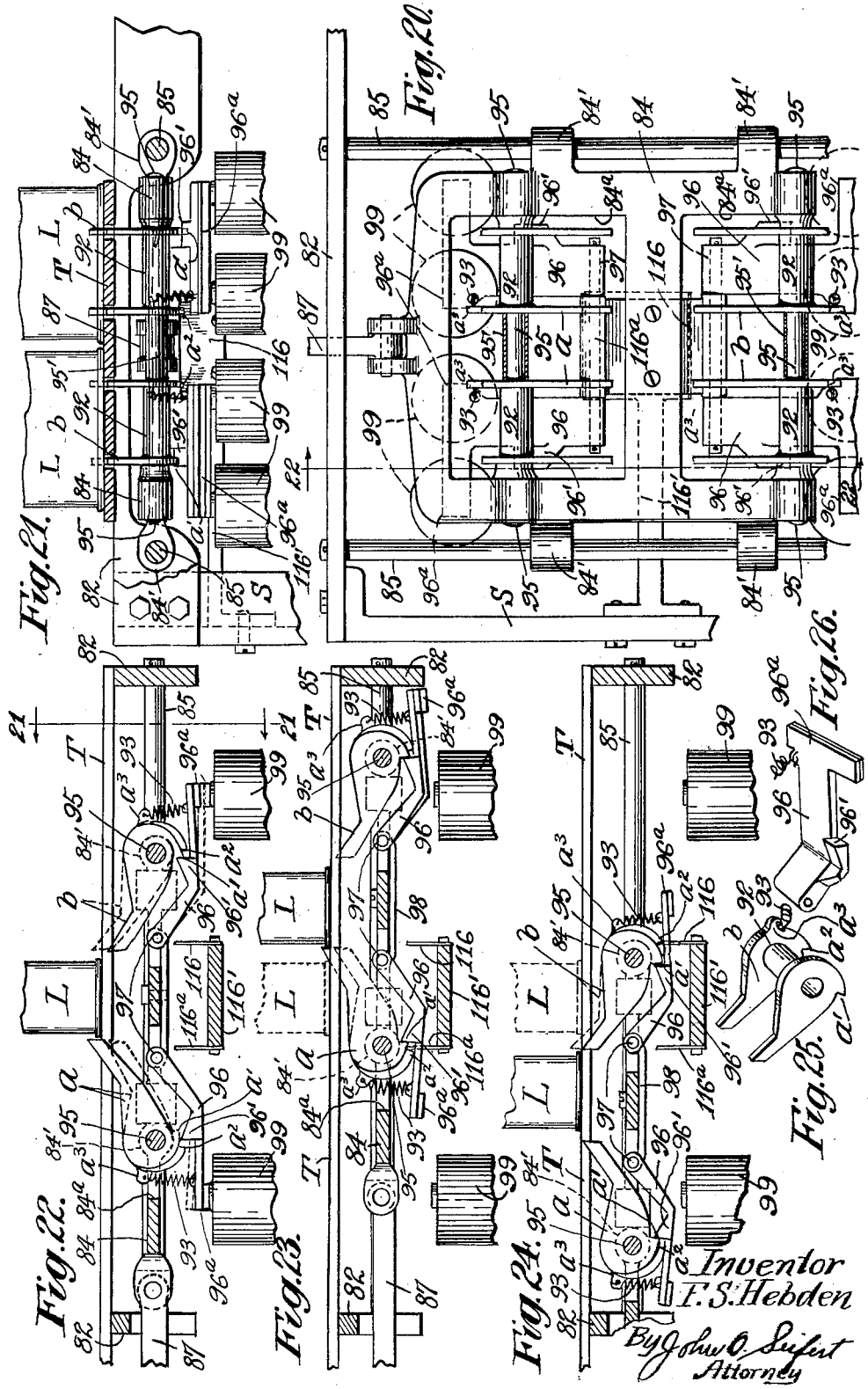

Patented Sept. 19, 1933

1,927,263

UNITED STATES PATENT OFFICE 1,927,263

WEIGHING MECHANISM

Frank S. Hebden, Chicago, Ill., assignor to Merrick Scale Mfg. Company, Passaic, N. J., a corporation of New Jersey Application March 23, 1931. Serial No. 524,497

18 Claims. (Cl. 209—121)

This invention relates to weighing mechanism, and it is the object of the invention to provide weighing mechanism adapted to counterbalance successive loads of predetermined weight and to combine therewith means controlled by the weighing mechanism to select or sort weighed loads or articles of greater or less weight from loads or articles of predetermined weight.

A further object of the invention relates to automatic weighing mechanism and the provision of means operative alternately with the weighing of a load or article to deliver articles to and from the weighing mechanism.

Another object of the invention is to provide in automatic weighing mechanism to counterbalance a load of a predetermined weight, and having means to deliver articles to the weighing mechanism to be weighed and deliver articles from the weighing mechanism after they have been weighed, electromagnetically operated means to which the weighed articles are delivered from the weighing mechanism and normally inactive during the weighing of articles of the predetermined weight, and electric circuit making and breaking means connected in circuit with the electromagnetically actuated means controlled by the movement of the weighing mechanism to over-load or under-load positions by the applying of articles thereto of greater or less weight than said predetermined weight to render the electromagnetically operated means active to select and deliver weighed articles of greater or less weight from articles of the predetermined weight.

In the drawings accompanying and forming a part of this application, Figure 1 is a perspective view of an apparatus embodying the present invention and looking at the front, one side and the top of the apparatus.

Figure 2 is a perspective view looking at the left of Figure 1.

Figure 3 is a perspective view of the upper portion of the apparatus looking at the back and rear side thereof.

Figures 4 and 5 are front and side elevations, on an enlarged scale, of the circuit making and breaking means controlled by the weighing mechanism.

Figures 4a and 5a are detail views of friction contacting wheels forming a part of the means controlled by the weighing mechanism to render the selective means active and inactive.

Figure 6 is a perspective view similar to Figure 1, on an enlarged scale and partly broken away, to show the driving connections of the operating parts.

Figure 7 is a plan view of means controlled by the movement of the weighing mechanism to actuate the circuit making means shown in Figures 4 and 5.

Figure 8 is a side elevation of the parts shown in and looking at the bottom of Figure 7.

Figure 9 is a view on an enlarged scale taken on the line 9—9 of Figure 8 looking in the direction of the arrows and showing the connecting means thereof with the weighing mechanism and a dash pot in relation thereto to prevent undue vibration of the weighing mechanism.

Figure 10 is a side elevation of the means for delivering articles to and from the weighing mechanism and the means to select weighed articles of greater or less weight from articles of predetermined weight.

Figure 11 is an elevational view looking at the right of Figure 10.

Figure 12 is a perspective view of a portion of the article delivering means.

Figure 13 is a perspective view of a shelf from which the articles to be weighed are fed to the delivery means and showing an adjustable stop in relation thereto for gauging articles relative to the delivery means.

Figure 14 is a plan view of the mechanism shown in Figure 10 and showing the driving connections thereof with power means.

Figure 15 is an elevational view showing in a diagrammatic manner the relation of load receiving means of the weighing mechanism to the electromagnetically operated article selecting means and the actuating means for the circuit making and breaking means as well as the control connection thereof with the weighing mechanism.

Figure 16 is a diagrammatic view of the circuit arrangement and electrical connections of the electromagnetically operated selecting means with a source of electricity.

Figure 17 is a sectional plan view of means to feed articles from the shelf shown in Figure 13 to the article delivery means and circuit making and breaking means controlled thereby connected in the circuit of the article selecting means.

Figure 18 is an elevational view of circuit making and breaking means to connect the selecting means in circuit with a source of current supply alternately with the operation of the article delivery means.

Figure 19 is an elevational view of a portion of an actuating lever for the article selecting means and showing the same in relation to an actuating cam therefor.

Figure 20 is a plan view of the article selecting means.

Figure 21 is a sectional view taken on the line 21—21 of Figure 22 looking in the direction of the arrows.

Figures 22, 23 and 24 are sectional views on an enlarged scale taken on the line 22 of Figure 20 looking in the direction of the arrows and showing the parts in different positions.

Figure 25 is a perspective view of an article engaging an ejecting pawl of the article selecting means; and Figure 26 is a perspective view of a latch for retaining the pawls normally in inoperative position.

In the embodiment of the invention illustrated the weighing mechanism is mounted on a table A mounted upon and supported in superppsed relation to a base B by posts or pillars C, the article feeding and delivery means as well as the selecting or sorting means being mounted on and supported by standards S, S' from the base.

While the invention is shown as embodying duplex weighing mechanism and each weighing mechanism as having a circuit making and breaking means associated with and controlled thereby, the invention is applicable for use with a single weighing mechanism having a circuit making and controlling means associated therewith, and as said mechanisms are of the same structure description of one will suffice for both and the same reference characters have been applied to corresponding parts for a clear understanding of the same. The weighing mechanism comprises a weighing beam or lever 27 supported to have rocking movement intermediate the ends by an edgewise stiff and laterally flexible plate 28 clamped at a marginal portion to a shoulder of the beam, as at 29, and at the opposite marginal portion to the upper end of a standard 31 mounted on the table A. A load receiver 32 of U-shape in cross section is supported from the beam by a yoke member 33 having a flexible connection 34 with one end of the beam by an edgewise stiff and laterally flexible plate similar to the connection of the beam with the beam support 31. Both beams are mounted on the standard 31 to extend in parallel relation and the load receivers are connected with the beams to be suspended therefrom in alined relation to each other. Poise weight of predetermined weight is applied to the opposite end of the lever, as at 35, to adapt the weighing mechanism to weigh or counterbalance loads or articles of predetermined weight. To prevent undue vibration or chattering of the beam by the movement of the load onto or from the load receiver the poise weight carrying end of the lever has a plunger in the form of a disk 36 connected thereto engaging in a liquid carrying pot 37 (Figure 9), said plunger being carried by a rod 38 pivotally suspended from a head 39 connected by a pair of rods 40 to a head 41 supported on a pivot member 42 adjustably carried by the beam, for a purpose to be hereinafter described. Undue movement of the beam to over-load position is retarded by a stop 43 secured to the ends of rods 44 fixed in and extending from the beam support 31 toward the load receiver carrying end of the beam, the stop terminating at a predetermined point below the beam and being arranged whereby it will extend below and serve as a stop for the beams of both weighing mechanisms. To bring the load receiver carrying end of the weighing mechanism into true balance or equilibrium with the poise weight carrying end the load receiver is provided with weight applying means, as shown at 45.

The articles or loads to be weighed, shown as consisting of empty containers L, are successively delivered to and from the load receiver, and shown in the present instance as comprising empty commodity dispensing containers, although it will be obvious that other forms of loads or articles may be weighed and that the containers may be filled with a commodity prior to the weighing. The articles are delivered to the load receiver from a shelf 46, shown in detail in Figure 13, having a yoke portion 47 intermediate the ends with the ends of the yoke portions flanged laterally, the shelf being mounted upon the standard S' by the engagement of screws in openings intermediate the yoke portion and threaded into the standard with a portion of the shelf extended forward to adjacent the load receiver 32 and the opposite end extending rearwardly to and over a portion of a conveyor D where it passes over a supporting drum 48 therefor, the undersurface of said extremity of the shelf being bevelled so that said end will be in contiguous relation to the conveyor with the other surface of the shelf in the plane of the surface of the upper stretch of the conveyor. The conveyor is for the purpose of delivering articles to the shelf. Plates 49 (Figures 10 and 14) are fixed upon the flanges of the yoke members to extend in a plane above and at the sides of the shelf in parallel relation with the rearwardly extending shelf portion and having the opposed inner edges bevelled to diverge toward the end, said plates serving to direct the articles from the conveyor to and guide them relative to the shelf. The guide plates are united at the connection thereof with the shelf by an upwardly extending yoke member 50.

The articles L are positioned on the shelf by the conveyer D against a stop 51 to gauge the articles relative to the means to deliver the articles from the shelf to the load receiver 32 of the weighing mechanism, said means in the present instance being arranged to deliver two articles from the shelf, one to each of the load receivers of each of the weighing mechanisms. The article delivery means comprises a pair of article engaging and gripping members 52 arranged in a plane above and at opposite sides of the shelf and adapted to have movement over the shelf into engagement with articles on the shelf and in a direction laterally of the shelf to normal position and normally urged to said latter position, said grippers also having reciprocatory movement in a direction from the shelf toward and away from the load receiver 32. The grippers are carried by arms 53 extended upward from one end of yoke members 54 mounted on parallel shafts 55, 55' rotatably mounted in the standards S, S' below and at opposite sides of the shelf, the yokes being adapted to have sliding movement on the shafts and participate in the rotative movement thereof by keys fixed in the bearings of the yoke members on said shafts engaging a keyway in the shafts. The shafts are rocked and thereby the gripper carrying arms 53 to move the grippers over and into engagement with articles on the shelf by an arm 56 fixed at one end to and extending downward from the shaft 55', said arm carrying a roller at the free end to engage a cam on a disk 57 fixed to a shaft 58 (Figures 10 and 11)

driven from a motor-generator M, G, by a gear 59 on said shaft meshing with a gear 60 on a shaft 61 driven from the motor by a belt passing around a pulley on the motor shaft and a pulley on the shaft 61, as at 62 in Figure 14. The shaft 55 is rocked from shaft 55' by an arm 64 on said latter shaft engaging an arm 63 on shaft 55 (Figures 1, 6, 10, 11 and 14). The arm 56 is urged to position the cam following roller in engagement with the cam and thereby the shafts rocked to position the article grippers to the sides of the table by a spring 65 connected at one end to the arm 56 and at the opposite end to an arm 66 fixed to shaft 55. To reciprocate the gripper carrying arms on the shafts 55, 55' toward and away from the load receiver 32 an actuator 67 (Figure 12) is slidably mounted on the shafts and embodying a pair of integrally connected heads mounted on the shafts at opposite ends of the arm carrying yokes 54, as at 67' in Figure 10. Movement is imparted to the actuator 67 by a lever 68 pivotally mounted on the base B and having a link connection 69 with an ear 69' of the actuator. The arm is urged by a spring 70 to normally position the gripper carrying arms with the grippers 52 positioned relative to the shelf and is moved in the opposite direction by a cam 71 on the shaft 58 engaged by a following roller carried by the arm, as at 71'. The gauge stop 51 is carried by a rotatably supported rod 72 and is normally positioned as shown in Figure 13 for engagement by articles fed along the shelf, and is moved out of gauging position just previous to the movement of the gripper members to transfer articles from the shelf by a cam 73 on shaft 58 engaged by a following roller carried by an arm, as at 74, fixed to the rod 72. At the end of the delivery movement of the gripper carrying arms the roller carried by arm 56 will ride off the cam edge of disk 57 and the grippers will be moved laterally away from the articles by spring 65 when retrograde movement is imparted to the gripper carrying arms to position the grippers relative to the shelf. To prevent undue swaying of the load receivers as articles are delivered thereto the yoke members 33 therefor are extended through openings in retaining members 33' fixed to rails 82 extended between and secured to the standards S, S'.

As the articles are delivered to the shelf by the conveyer D they are fed along the shelf into engagement with the stop 51 and gauged relative to the grippers 52 by a pair of rollers 75 (Figures 10, 11 and 14) carried at the upper ends of a pair of vertical shafts 76 positioned above and at opposite sides of the shelf and adapted to have movement toward and away from the shelf. The shafts are driven from a shaft 77 by bevelled gearing 78, the shaft 77 being driven from shaft 58 by a pinion 79 on said shaft 77 meshing with the gear 59. To permit of the movement of the shafts to position the rollers toward and away from the shelf the shafts are rotatably mounted in bearings 80 pivotally mounted on the standard S' and in bearings 81 slidably mounted on said standard to have movement transversely of the shafts. By this arrangement of mounting the shafts they may be adjusted to effect movement of the rollers toward and away from the table without throwing the gearing 78 out of mesh.

The weighing mechanism is adapted for the automatic weighing of articles of predetermined weight and means are provided to select or sort articles which have been weighed and having a weight greater or less than said predetermined weight from weighed articles having such predetermined weight. For this purpose there is provided a table T at the side of the load receiver 32 opposite to that at which the shelf 46 is arranged, and comprising slats extended transversely of the line of delivery of articles from and in the plane of the load receiver, said slats being fixed upon the standard connecting rails 82 in parallel spaced relation to provide the table with parallel slots. The articles are delivered successively from the shelf to the load receiver and from the load receiver to the table by the successive articles delivered thereto by the grippers 52 of the transferring means. The articles of predetermined weight are delivered from the table by successive articles delivered thereto from the load receiver in the line of delivery of the articles to a chute 83. The delivery means of the selecting or sorting means delivers the articles of overweight laterally to the left of the table, as viewed in Figures 1, 2 and 6, to a chute 83a, and any articles of underweight laterally to the right of the table to a chute 83b. The selecting or sorting means is controlled by the movement of the weighing mechanism to over-load or under-load positions, and comprises a carriage 84 slidably mounted, as at 84', on rods 85 (Figures 20 to 24) fixed at the ends in the standard connecting rails 82 below the table and intermittently reciprocated transversely of the line of delivery of the articles onto the table alternately with the actuation of the article transferring means by a lever 86 pivotally mounted at one end upon the base B and at the opposite end connected by a link 87 (Figures 2 and 6) with the carriage, the lever being urged in one direction by a spring 88 and in the opposite direction by a cam 89 on a shaft 90 engaged by a cam following roller carried by the lever (Figures 6 and 19), the shaft 90 being driven through bevelled gearing 91 (Figures 1, 2, 6 and 14) from the shaft 58.

The over-weight and under-weight articles are delivered from the table to the chutes 83a and 83b, respectively, by oppositely disposed pawls a and b pivotally mounted on the carriage and extending in a direction toward each other, one pair of pawls being provided for each article delivered to the table, and in the present instance where two articles are delivered to the table in order to accommodate the same for effecting a selection of two articles the carriage is arranged with duplex pairs of pawls. Each of the pawls includes a pair of like pallets connected in spaced relation by a sleeve 92 (Figure 25), one pawl having a notch a' arranged slightly in advance of a similar notch a2 in the other pallet and having a pin carrying ear a3 for the connection of a spring 93 for a purpose to be hereinafter described. The pawls are pivotally mounted in openings 84a in the carriage upon rods 95 extending transversely of the carriage openings and mounted at the ends in the carriage. In the use of two pairs of pawls as in the present instance a spacing sleeve 95' is engaged upon the shafts 95 in interposed relation to the pawls. The pawl pallets are arranged with a finger portion with the fingers of opposed pawls extending toward each other and inclined upwardly, and said pawl pallets are arranged in alinement with the table slots and adapted to be engaged in the table slots and projected above the table. The pawls are normally releasably retained by latches 96 in position with the ejector fingers in a plane below the top of the table during the reciprocatory movement of the pawl carrying carriage, the latches being pivotally mounted at one end, as at 97, on the sides of a member 98 secured by screws to the under-side of the recess separating portion of the carriage within the pivotal supports of the pawls and the latches extending beyond the pivot supports of the pawls with the other ends of the springs 93 connected thereto to move the latches and the pawls toward each other for engagement of the pallet notch a' with a lip 96' projected from the latches. The springs 93 also serve to project the finger portions of the pawls through the table slots and above the table when the pawls are released from the latch lips 96'. The latches are released from the pawls to select and deliver articles from overweight and underweight to the chutes 83a, 83b at the opposite sides of the table by electromagnetic means controlled by the movement of the weighing mechanism to overload and underload positions. For this purpose electromagnets 99 of the solenoid type are mounted on a shelf 100 mounted on the standards S, S' below the table T and positioned so that during the periods of rest of the carriage 84 a laterally elongated portion 96a at the end of the latches opposite to that at which they are supported will be arranged in opposed relation to the cores of the electromagnets, as shown in Figure 22, the latches being of magnetizeable material, or they may be made of other material and a plate of magnetizeable material secured to the elongated end portions whereby said portions of the latches will serve as armatures for the electromagnets. When the electromagnets are energized they will attract the armature portion of the latches thereto and release the latch lips 96' from the pawl notches a', as shown in dotted lines in Figure 22, when the pawl fingers through the action of the springs 93 and the weight of the latches will be projected through the table slots above the table. While one electromagnet may be used for this purpose a pair of electromagnets are preferably utilized for each latch as shown in Figure 2. Each pair of electromagnets are connected in normally open independent circuits with a source of electric current supply with circuit making and breaking means interposed in each circuit controlled by the movement of the weighing mechanism to overload or underload positions to energize the electromagnets. While the electromagnets may be electrically connected in circuit with any suitable source of current supply, in the present instance the power means comprises a combined generator and motor and the electromagnets are connected in circuit with the generator through circuit making and breaking means.

A circuit making and breaking means is provided for each circuit of the electromagnets and as they are of the same construction and arrangement description of only one is deemed necessary and the same reference characters have been applied to both. This circuit making and breaking means (Figures 3, 4 and 5) comprises a contact terminal 101 carried by a yielding member of conducting material 101a connected in circuit by a conductor 101b with a terminal of one pair of solenoids, and a contact terminal 102 carried by a yielding member of conducting material 102a connected by a conductor 102b with one terminal of the other pair of solenoids, said contact terminal carrying conductors being mounted upon a panel 103 of insulating material mounted on an extension of a bracket 104 mounted on a plate 105 on the table A to extend vertically at a side of the poise weight carrying end of the weighing lever 27. A contact terminal 106 in the form of a pin extended through and carried by a conductor member 106a extended between the conductors 101a and 102a with the ends of the pin terminal 106 opposed to the contact terminals 101, 102, and the conductor member carrying contact pin 106 adapted to move the terminal contact pin into and out of contact with either of said terminals. The conductors 101a, 102a are retained in predetermined position relative to the contact terminal pin 106 by adjustable means 102c interposed between the extremities of such conductors. The conductor 106a is connected to one side of the source of current supply, in the present instance the generator G, by a conductor 106b connected with a terminal member 106c which is electrically connected by spring 106d with the conductor 106a. The other terminals of the solenoids of both pairs of electromagnets are connected with the opposite side of the generator, as by a conductor 106f, shown diagrammatically in Figure 16, the said terminals of the solenoids for actuating the pawls b being connected directly with said conductor 106f and the terminals of the solenoids of the actuating magnets for the pawls a being connected with conductor 106f by a branch conductor 106e.

The conductor 106a is actuated to engage contact 106 with the contact-terminal 101 by means set in operation and controlled by the movement of the weighing mechanism to overload position, and to engage the contact pin 106 with the contact terminal 102 when the weighing mechanism is moved to underload position. This means is shown in detail in Figures 7 to 9, and comprises a U-shaped member 107 having trunnions 107' extended outwardly from the opposite legs thereof whereby said member is rotatably supported in the legs of a yoke member 107a mounted on the bracket 104 to have yielding rocking movement in the plane of movement of the weighing lever 27 by edgewise stiff and laterally flexible plates 108 clamped at opposite marginal portions to the connecting portion of the yoke member 107a in line with the yoke legs and to the bracket 104, as shown in Figure 9, and in a manner similar to the mounting and supporting of the weighing lever 27 from the support 31. The conductor 106a carrying the contact pin 106 is connected with the U member 107 to participate in the movement thereof by a connecting member 107b of insulating material, as shown in Figures 4 and 5.

A frame 109 of substantially elongated rectangular form is rotatably mounted at one end on a shaft 107c fixed in and extending through the U member 107 and at the opposite end mounted on a sleeve 107d slidably mounted on the shaft and urged into engagement with a bearing member in the frame 109 by a spring 107e interposed between the sleeve and a collar fixed upon the shaft, whereby the frame is adapted to rotate about said shaft on an axis extending transverse to the axis of rotation of the U member 107. A friction wheel or disk 110 is fixed to a shaft 110' mounted to rotate on a vertical axis in a bifurcated member 109a secured to the frame 109 forwardly of the rotatable support of the U member 107 in the yoke member 107a, the axis of said shaft intersecting the axis of rotation of the frame 109 on the shaft 107c and the disk rotating in the plane of the axis of rotation of said frame. The friction wheel is counterbalanced by poise weight 111 removably mounted on a pin extended vertically from the frame 109. The periphery of wheel 110 is urged into frictional engagement with and driven from a friction wheel or disk 112 of somewhat greater width than the wheel 110 by urging the yoke member 107a in a direction toward the wheel 112 by a spring 104' interposed between an adjustable abutment 104a on the bracket 104 and an arm 107f extended from the connecting portion of said yoke member opposite to the wheel 110.

The wheel 112 is fixed to a shaft 112a mounted in a bracket 112b fixed to the plate 105 to rotate on an axis parallel with the axis of shaft 110'. The wheel 112 is continuously driven by a shaft 112 rotatable in bracket 112b having a bevel gear connection 113a with the shaft of wheel 112 and driven by a belt 114 passing around a pulley 113b fixed to shaft 113 and a pulley 77a on shaft 77. The belt 114 also passes over the pulley 113b of the contact actuating means controlled by the duplex weighing mechanism and over an idler pulley 114' adjustably mounted on the table A to take up slack in the belt. The rotative movement of the U member 107 is limited by the bifurcation in the end of an arm 107g extended from the U-member engaging the inner portion of reduced width of the connecting member of the yoke member 107a, as at 107h.

The frame 109 is operatively connected with the weighing lever 27 and the movement thereof to overload and underload positions is transmitted to said frame by an arm 109b fixed to and extending laterally of the frame with the extremity extended at a right angle between the rods 40 carrying the head 39 from which the carrying rod 38 for the plunger of the dash pot is suspended, and adjustably carrying a pivot member 109c to engage the head 39. The pivot member 109c is maintained in engagement with the head 39 by weighting the side of the frame 109 from which the arm 109b extends, as by a weight mounted on an arm of the frame extended beyond the friction wheel 110, as at 109d.

Assuming the weighing mechanism has been moved to overload position by a load or article applied to the load receiver of greater weight than the predetermined weight for which the weighing mechanism is set, this will elevate the poise weight carrying end of the weighing beam 27 and by the engagement of the pivot pin 109c carried by the frame arm 109b with the head 39 suspended from the weighing beam by the rods 40, said movement of the weighing beam will be transmitted to the arm 109b moving said end of the arm upward and rotating the frame 109 about the axis of its support 107c on the U-member 107, thereby adjusting the friction wheel 110 to rotate in a plane inclined to the plane of rotation of friction wheel 112, as shown in a diagrammatic manner in Figure 4a, and causing the friction wheel 110 to travel up the friction face of the wheel 112 and thereby tilting the friction wheel carrying end of frame 109 upward rotating the U-member 107 and moving with it the conductor member 106a to engage the contact making circuit of and energizing the electromagnets 99 shown at the right of Figure 22, the energizing of said magnets attracting thereto the end of the latch 96 associated therewith, as shown in dotted lines, releasing the pawl b, and the pawl moving to the position shown in dotted lines above the table T at the side of a container delivered to the table from the load receiver and which container is of a weight greater than the predetermined weight, the pawl a being retained in its retracted position shown in dotted lines by its associated latch 96. The pawl carrying carriage 84 is then moved through the cam 89 in a direction to the right of Figure 22, the pawl a passing below the container, and during the return movement of the carriage by its spring 88 the pawl b engages and moves the container laterally upon the table from the dotted line to the full line position shown in Figure 24, and said container by successively delivered containers of overweight is delivered to the chute 83a. As the pawl b approaches the end of said container ejecting movement the pallet notch a2 engages an abutment in the form of a vertical plate 116, intersecting the path of travel of the pawl b, said plate being fixed to a bracket 116' extended inward from the standard S'. This engagement of the pallet notch a2 with said abutment imparts retracting movement to the pawl until the pawl notch a' is moved beyond the lip 96' of the latch and the latch is moved to engage the latch lip with said pallet notch through the tension of spring 93, when the carriage is again positioned by the cam as shown in Figure 22 with the pawls a, b positioned below the table T at opposite sides of the line of delivery of articles thereto from the load receiver.

Should the weighing mechanism be moved to underload position and a consequent downward movement of the poise weight carrying end of the weighing lever 27, the head 39 (Figure 9) will be moved in a direction away from the pivot member 109c, but said pivot member will follow and be maintained in engagement with the head due to the applying of the weight 109d to the frame 109 causing said frame to tilt in a direction opposite to that in which it was tilted by the upward movement of the head 39 by the upward movement of the poise weight carrying end of the weighing lever, and this tilting movement of the frame 109 causing the friction wheel 110 to be tilted therewith to incline in a plane in an opposite direction, as shown in a diagrammatic manner in Figure 5a, and caused by the rotation of wheel 112 to ride across the friction face thereof in a downward direction and a consequent downward tilting of the friction wheel carrying end of the frame 109 and moving therewith the U-member 107 and the conductor member 106a to engage the contact 106 carried thereby with the contact terminal 102 and closing the circuit of and energizing the other pair of magnets 99 attracting and releasing the latch 96 from pawl a, said pawl being moved by spring 93 from its normal position, shown in dotted lines, to the full line position (Figure 22) and engaged at the side of the weighed container of underweight delivered from the receiver onto the table T. Upon the actuation of the pawl carrying carriage the container will be moved from the dotted line position to the full line position shown in Figure 23 to be delivered by successive containers or articles of underweight to the chute 83b. As the pawl a approaches the end of said movement the pawl notch a2 of said pawl will engage an abutment plate 116a also mounted on the bracket 116' to intersect the path of movement of the pawl a and moving the pawl to retracted position until the pallet notch a' passes and engages the latch lip 96', which engagement is effected by the spring 93, when the carriage is returned to its normal position with the pawls retracted and positioned below the table at opposite sides of the line of delivery of articles thereto.

In the use of the selecting means with duplex weighing mechanism two pairs of the pawls a, b are provided, as shown in Figures 20 and 21, and two containers or articles are delivered simultaneously from the load receivers 32 to the table relative to said pawls, as shown in Figure 21. Should both of the containers be of overweight both pawls b will be selected and actuated to eject the articles from the table for delivery to the chute 83a, and should both containers or articles be of underweight both pawls a will be selected and actuated to eject the containers or articles to the opposite side of the table to be delivered to the chute 83b. Should one article be of underweight and the other article of overweight the pawl a of one pair of pawls and the pawl b of the other pair of pawls will be selected and actuated to eject the containers or articles to opposite sides of the table for delivery to the chutes 83a and 83b upon the actuation of the pawl carrying carriage. In the use of one pair of pawls, or duplex pairs of pawls, should the containers or articles be of the predetermined weight they will remain upon the table in the line of delivery of successive articles from the load receiver and be delivered by said successive articles delivered to the table to the chute 83.

The weighing mechanism with no article or container applied is normally moved to underload position by the poise weight 35 with the contact maker 106 in contact with the contact 102 and closing the circuit of the actuating electromagnets 99 for the pawl a through the conductor 102b, and the conductor 106a connected with the conductors 106c and 106b, with the result that the pawl a would be released and projected to article ejecting position, and upon an article being transferred from the load receiver to the table T without a successive article following from shelf 46 to the load receiver such article would be ejected as being of underweight whether it were of overweight, underweight or of the predetermined weight. For this purpose circuit making and breaking means are interposed in the electrical connection of the electromagnets, preferably in the conductor 106f, which is normally urged to open position and adapted to be closed by the article feeding rollers 75 when engaging an article on the shelf to be engaged and transferred to the load receiver by the grippers 52. This circuit making and breaking means, as shown in detail in Figure 17 and diagrammatically in Figure 16, comprises a pair of yielding contact terminals 117 mounted on and insulated from the standard S' in relation to the mounting of the bearings 81 for the roller carrying shafts 76 and interposed in the conductor 106f. Each mounting for the bearings 81 carries a contact member 117' and insulated therefrom and electrically connected by a conductor 117b, said contacts with no article positioned between the rollers 75 being positioned out of contact with the contacts 117, as shown in dotted lines in Figure 17. When the shafts 76 are moved to spread position by engagement of an article on the shelf between the rollers 75 the contacts 117' are moved into engagement with the contact terminals 117 closing the circuit through the conductor 106f.

In starting the apparatus an article is placed upon the load receiver, which either effects a movement of the weighing mechanism to equilibrium, overload or underload position according to the weight of the article, and said article is transferred to table T from the load receiver by a successive article transferred from the shelf to the load receiver. Should there be no article on the shelf the circuit of the electromagnetic means will be maintained open by the circuit making means controlled through the feeding rollers 75. As soon as an article is delivered to the shelf and engages between the feed rollers 75 the contact makers 117' will be moved into contact with the contact terminals 117 closing the circuits of the electromagnetic means through the conductor 106f and adapted to be rendered active and inactive by the movement of the weighing mechanism to overload and underload positions.

Means are provided to render the electromagnetic means active during the periods of rest of the article transferring means and inactive during the transferring of articles from the shelf to the load receiver and from the load receiver to the table, said means comprising circuit making and breaking means interposed in the connection of the electromagnetic means with the generator G, shown in detail in Figure 18 and diagrammatically in Figure 16, and comprising a pair of opposed contacts 118 mounted on and insulated from the base B and a contact maker in the form of a disk 119 of conducting material mounted on the shaft 58 with a peripheral portion to engage between the contacts 118. The disk has segmental sections 120 of insulating material secured to opposite faces. When the segments of insulating material engage between the contacts 118 during the rotation of the shaft 58, and which is during the period of the actuation of the transferring means, the circuit will be broken, and when the portions of the disk between the insulator segments is interposed between the contacts 18 the circuit will be established through the disk, this being during the periods of weighing the load and during the actuation of the article selecting means.

In Figure 16 I have illustrated in a diagrammatic manner the electrical connection of the different parts of the article selecting means.

Having described my invention, I claim:

1. The combination of weighing mechanism embodying load receiving means and means to counterbalance an applied load of predetermined weight, a continuously moving surface, a rotatable wheel engaging said surface to transmit the movement thereof to rotary movement of the wheel and adapted to rotate in planes parallel with and in angular relation to the plane of movement of the moving surface, a connection between said wheel and the weighing mechanism operative to adjust the wheel to rotate in planes in angular relation to the moving surface by the movement of the weighing mechanism to overload or underload positions, and means rendered active by said adjustment of the wheel through the movement of the weighing mechanism to overload or underload positions to select weighed articles of greater or less weight from the articles of the predetermined weight and deliver said articles to different places.

2. The combination of weighing mechanism embodying load receiving means and means to move the weighing mechanism to position of equilibrium by the applying of a load to the load receiver of predetermined weight, a continuously moving surface, a wheel, means in which the wheel is mounted to rotate and have adjustment about an axis transverse to the plane of rotation thereof and said means adapted to position the wheel into frictional contact with the moving surface, means to connect the wheel mounting means with the weighing mechanism to adjust said means to effect rotation of the wheel in the plane of movement of said surface with the weighing mechanism in equilibrium and in angular relation to the plane of the movement of the moving surface by the movement of the weighing mechanism to overload or underload positions by an article weighed thereby, and means relative to which weighed articles are positioned from the weighing mechanism rendered active by the adjustment of said wheel mounting means to select weighed articles of greater or less weight from the articles of the predetermined weight.

3. The combination with weighing mechanism including a load receiver, of means to successively deliver articles to and from the load receiver operative alternately with the weighing of articles, a friction surface continuously travelling in a fixed plane, a wheel, a frame in which the wheel is rotatably mounted, a support in which the frame is mounted to position the wheel in contact with the travelling surface to transmit the movement thereof to rotary movement of the wheel, and the frame being tiltable in the support on an axis extending transversely of the axis of rotation of the wheel to change the plane of rotation of the wheel in angular relation to the plane of travel of the friction surface, means in which the support is mounted to have movement with the frame in a plane transversely of the travel of the friction surface, means to connect the frame with the weighing mechanism to tilt the frame to change the direction of travel of the wheel by and in accordance with the movement of the weighing mechanism to overload or underload positions, a table to which weighed articles are delivered from the load receiver, means reciprocatory transversely of the table alternately with the delivery of articles thereto to select weighed articles delivered to said table having a weight greater or less than the predetermined weight in different directions from said table, and means controlled by the movement of the support for the wheel carrying frame to render said latter article delivery means active.

4. The combination of weighing mechanism including a load receiver and adapted to counterbalance a load of predetermined weight, a shelf at one side of the load receiver, a table at the opposite side of the load receiver, means to successively deliver articles from the shelf to the load receiver and weighed articles from the load receiver to the table, a carriage reciprocatory transversely of the table and arranged out of the line of travel of articles delivered to the table, means carried by the carriage normally releasably retained in position out of and to be moved transversely of the line of delivery of the articles onto the table by the article feeding means during the reciprocation of the carriage and adapted to be released and projected to position to engage and eject an article to a side of the table during the reciprocation of the carriage, and electromagnetic means controlled by the movement of the weighing mechanism to over-load position by an article of greater weight than said predetermined weight operative to release a part of said means to engage and move an article to one side of the table by the movement of said means in one direction, and by the movement of the weighing mechanism to under-load position by an article of less weight than such predetermined weight operative to release another part of said means to engage and move an article to the opposite side of the table by the movement of said means in the opposite direction.

5. The combination of weighing mechanism including a load receiver and poise weight to counterbalance a load of predetermined weight, a shelf at one side of the load receiver, a table at the opposite side of the load receiver having parallel transverse slots, means to deliver articles from the shelf to the load receiver and weighed articles from the load receiver to the table and deliver articles of such predetermined weight from the table in one direction, and means operative to select and deliver articles of greater or less weight in different directions from the table, comprising a carriage reciprocatory transversely of the table alternately with the operation of the article delivery means, a pair of pawls pivotally carried by said carriage yieldingly urged to position to engage the table slots and projected above the table, means to normally releasably retain said pawls in retracted position below the table, electromagnetic means controlled by the movement of the weighing mechanism to overload and under-load positions by articles of a weight greater or less than the predetermined weight to release said pawls from the retaining means to be projected by the yielding means above the table and said pawls being adapted to engage and move said articles as they are delivered to the table laterally of the table in opposite directions, and means to move the pawls in relation to the pawl retaining means at the end of the article selecting and delivery movements of the pawls.

6. The combination of weighing mechanism including a load receiver and poise weight to counterbalance a load of predetermined weight, a shelf at one side of the load receiver, a table at the opposite side of the load receiver having parallel transverse slots, means to deliver articles from the shelf to the load receiver and weighed articles from the load receiver to the table and deliver articles of such predetermined weight from the table in one direction, and means operative to select and deliver articles of greater or less weight in different directions from the table, comprising a carriage intermittently reciprocatory transversely of the table alternately with the operation of the article delivery means, a pair of pawls pivotally carried by said carriage yieldingly urged to position to engage and be projected through the table slots above the table, means to normally releasably retain said pawls in retracted position below the table, electromagnetic means connected in normally open electric circuits, circuit closing means controlled by the movement of the weighing mechanism to over-load position by an article of a weight greater than the predetermined weight to energize said electromagnetic means to actuate and release said pawl retaining means from one pawl to be projected by its yielding means above the table and said pawl by the movement of the carriage in one direction engaging and moving said article as it is delivered to the table laterally of the table in one direction, and by the movement of the weighing mechanism to under-load position by an article of a weight less than the predetermined weight to energize the electromagnetic means to actuate and release the pawl retaining means from the other pawl to be projected by its yielding means above the table and said pawl by the movement of the carriage in the opposite direction engaging and moving said article as it is delivered to the table laterally from the opposite side of the table, and means engaged by the pawls as they approach the end of the article selecting movements to move the pawls for engagement of the retaining means.

7. The combination of weighing mechanism including a load receiver and poise weight to counterbalance a load of predetermined weight, a shelf at one side of the load receiver, a table at the opposite side of the load receiver having parallel transverse slots, means to deliver articles from the shelf to the load receiver and weighed articles from the load receiver to the table and deliver articles of the predetermined weight from the table in one direction, and means operative to select and deliver articles of greater or less weight in different directions from the table, comprising a pair of pivoted pawls mounted below and having intermittent reciprocatory movement transversely of the table alternately with the operation of the article delivery means, means to yieldingly project the pawls through the table slots to position above the table, a latch for each pawl to normally releasably retain said pawls in retracted position below the table against the action of said yielding means, electromagnetic means to release the latches from the pawls, selective means controlled by the movement of the weighing mechanism to overload position by an article of a weight greater than the predetermined weight to render the electromagnetic means active to release a latch from one pawl and said released pawl by the movement of the pawls in one direction adapted to engage and move such article as it is delivered to the table in one direction from the table, and by the movement the weighing mechanism to under-load position by an article of a weight less than the predetermined weight render the electromagnetic means active to release the latch from the other pawl and said released pawl by the movement of the pawls in the opposite direction being adapted to engage and move said article as it is delivered to the table from the table in another direction, and abutments engaged by the pawls as they approach the end of the reciprocatory movements thereof to move the pawls to latching position.

8. Weighing mechanism as claimed in claim 6, wherein the electromagnetic means to release the latches from the carriage pawls embody electromagnets connected in normally open circuits, and relative to which the latches are normally positioned during the periods of rest and operative when energized to attract and move the latches to pawl releasing position, and the selective means to render the electromagnetic means active comprises normally open circuit closing means moved to circuit closing position by the movement of the weighing mechanism to over-load or under-load positions.

9. The combination of weighing mechanism including a load receiver and load counterbalancing means; a shelf at one side of the load receiver, a conveyer to transport and deliver articles to the shelf, and means to transfer articles from the shelf to the load receiver comprising a pair of parallel rotatably supported shafts to extend in a plane parallel to and at opposite sides of the shelf, an arm mounted on each shaft to participate in the rotative movement thereof and have sliding movement thereon, said arms extending upward at opposite sides of the shelf and having grippers fixed thereto above the shelf and the arms normally positioned with the grippers at the sides of the shelf, means to reciprocate the arms on the shafts toward and away from the load receiver, and means to rock the shafts with the arms to engage the grippers over and with articles on the shelf and retain them in said position during the movement of the arms to the load receiver.

10. The combination of weighing mechanism including a load receiver and load counterbalancing means, a shelf at one side of the load receiver, a conveyer to transport and deliver articles to the shelf, and means to transfer articles from the shelf to the load receiver comprising a pair of parallel rotatably supported shafts to extend in a plane parallel to and at opposite sides of the shelf, a yoke member mounted in each shaft to participate in the rotative movement thereof and have sliding movement thereon, each yoke member having an arm extended upward at opposite sides of the shelf and each arm arranged with a gripper member above the shelf and the arms normally positioned with the gripper members at opposite sides of the shelf, means slidably mounted on the shafts at opposite ends of the yoke members, a lever connected with said means normally urged to position said means and arm carrying yoke members with the grippers relative to the shelf, a rotatable shaft, a cam on said shaft to move the lever and the means connected with the arms to predetermined position relative to the load receiver, and means to rock the shafts with the arms to engage the gripper members over and with articles on the shelf and retain them in said position during the movement of the arms to the load receiver.

11. In weighing mechanism as claimed in claim 9, a stop to gauge the articles on the shelf relative to the grippers, and means operative alternately with the article transferring means to move the stop into and out of article gauging position.

12. In weighing mechanism as claimed in claim 9, a stop to gauge articles on the shelf relative to the grippers, continuously rotating rollers for the engagement of an article between the same and operative to move an article on the shaft into engagement with the stop, and means operative alternately with the article transferring means to move the stop into and out of article gauging position.

13. The combination of weighing mechanism including a load receiver and means to counterbalance a load of predetermined weight, means to deliver articles to and from the load receiver, means intermittently reciprocatory transversely of the line of delivery of the articles alternately with the actuation of the delivery means to select weighed articles of less or greater weight from weighed articles of the predetermined weight, electromagnets connected in independent electric circuits and relative to which the selecting means are positioned and serves as armatures to said electromagnets during the periods of rest thereof, circuit making and breaking means interposed in the circuits of the electromagnets and normally in circuit opening position, means set in operation by the movement of the weighing mechanism to over-load or under-load positions to actuate said circuit making and breaking means to circuit closing position to energize the electromagnets and render the selecting means active, and means for the engagement of the selecting means as said means approach the end of the reciprocatory movements to render the same inactive.

14. Weighing mechanism as claimed in claim 13, wherein the circuit making and breaking means comprises a fixed contact terminal connected in one side of each circuit for the electromagnets and a movable contact terminal connected in the opposite sides of both circuits of the electromagnets and operative by the means set in operation by the movement of the weighing mechanism when moved to over-load position to contact with a fixed contact terminal connected in and close one circuit and when moved to under-load position contact with the fixed contact terminal connected in and close the other circuit.

15. Weighing mechanism as claimed in claim 13, wherein the circuit making and breaking means comprises a fixed contact terminal connected in one side of each circuit of the electromagnets, a surface moving continuously in a fixed plane, a member supported to have tiltable movement transversely to the plane of movement of said surface, a contact terminal carried by said member and connected in the opposite side of the circuits of the electromagnets, a frame carried by said member to have tilting movement about an axis transverse to the movement of said frame and the plane of movement of said surface, a wheel rotatably carried by said frame frictionally engaging and rotated in the plane of movement of said friction surface and by the tilting of its carrying frame rotate planes inclining in opposite directions to the plane of movement of said surface and thereby impart tilting movement to the frame carrying member and engage the contact terminal carried thereby with one of the fixed contact terminals to close and open the circuits of the electromagnets, and an operative connection between the frame and weighing mechanism to tilt the frame by and in accordance with the movement of the weighing mechanism to over-load or under-load positions.

16. The combination of weighing mechanism including a load receiver and means to counterbalance a load of predetermined weight, a continuously travelling friction member, a rotatable wheel, a carrier for said wheel normally maintaining the wheel in contact with and to rotate in the plane of travel of the friction member and adapted to have movement about an axis transverse to the travel of the friction member to change the plane of rotation of the wheel in angular relation to the plane of travel of the friction member, an operative connection between said wheel and the weighing mechanism to transmit the movement of the weighing mechanism when moved to over-load and under-load positions to said carrier and change the plane of rotation of the wheel in angular relation to the travel of the friction member, and means set in operation by movement of the wheel carrier effected by a change in the plane of rotation of the wheel to select weighed loads of over-load and under-load from the loads of the predetermined weight.

17. The combination of weighing mechanism including a load receiver and means to counterbalance a load of predetermined weight, means to select weighed articles of overweight and underweight from the loads of predetermined weight, electromagnetically operated means to render said selecting means active, a friction member continuously travelling in a fixed plane, a friction wheel, a carrier in which said wheel is rotatably mounted normally maintaining the wheel in contact with and to rotate in the plane of travel of the friction member, said carrier being supported to have movement about an axis transverse to the travel of the friction member and having an operative connection with the weighing mechanism to transmit the movement of the weighing mechanism when moved to over-load or under-load positions to said carrier and change the plane of rotation of the wheel in angular relation to the plane of travel of the friction member and thereby control the actuation of the electromagnetically operated means to render the selecting means active.

18. The combination of weighing mechanism including a load receiver and poise weight to counterbalance a load of predetermined weight, a rotatable drive shaft, intermittently operative means actuated from the drive shaft to deliver articles to and from the load receiver, means operative from the drive shaft alternately with the actuation of the feeding means to select and deliver weighed articles of greater or less weight than said predetermined weight laterally of the line of delivery of articles from the load receiver, electromagnetic means connected in normally open electric circuits with a source of electricity operative when energized to render said selecting means active, circuit makers connected in the circuits of the electromagnetic means actuated to closing position by the movement of the weighing mechanism to over-load or under-load positions to close the circuits of and energize said electromagnetic means, and circuit making and breaking means operative from the drive shaft to open and close the circuit of the electromagnetic means alternately with the operation of the article delivery means.

FRANK S. HEBDEN.